(12) United States Patent
Jung

(10) Patent No.: US 7,961,106 B2
(45) Date of Patent: Jun. 14, 2011

(54) METHOD FOR CONSTRUCTING LOCATION MANAGEMENT SYSTEM USING RFID SERIES

(76) Inventor: Hyun-Chul Jung, Busan (KR)

( * ) Notice: Subject to any disclaimer, the term of this patent is extended or adjusted under 35 U.S.C. 154(b) by 431 days.

(21) Appl. No.: 12/160,575

(22) PCT Filed: Jan. 8, 2007

(86) PCT No.: PCT/KR2007/000131
§ 371 (c)(1),
(2), (4) Date: Jul. 10, 2008

(87) PCT Pub. No.: WO2007/081128
PCT Pub. Date: Jul. 19, 2007

(65) Prior Publication Data
US 2008/0316018 A1 Dec. 25, 2008

(30) Foreign Application Priority Data
Jan. 11, 2006 (KR) ........................ 10-2006-0002975

(51) Int. Cl.
*G08B 13/14* (2006.01)
*H04Q 5/22* (2006.01)
*G06K 9/48* (2006.01)

(52) U.S. Cl. ................. 340/572.8; 340/572.1; 340/10.1; 382/162; 382/199; 455/41.2

(58) Field of Classification Search ............... 340/572.1, 340/572.8, 10.1, 10.51, 825.49; 455/41.2; 702/57; 235/488; 156/176; 382/162, 199
See application file for complete search history.

(56) References Cited

U.S. PATENT DOCUMENTS

| | | | | |
|---|---|---|---|---|
| 6,396,947 | B1 * | 5/2002 | Doll | 382/162 |
| 7,245,227 | B2 * | 7/2007 | Winter et al. | 340/686.2 |
| 2003/0191602 | A1 * | 10/2003 | Lee et al. | 702/150 |
| 2003/0210975 | A1 * | 11/2003 | Garcia | 414/467 |
| 2007/0120670 | A1 * | 5/2007 | Torchalski | 340/572.1 |
| 2008/0266092 | A1 * | 10/2008 | Campero et al. | 340/572.1 |

FOREIGN PATENT DOCUMENTS

| | | |
|---|---|---|
| JP | 10-334198 | 12/1998 |
| KR | 1020000046644 A | 7/2000 |
| KR | 1020030080436 A | 10/2003 |
| KR | 1020050007719 A | 1/2005 |

* cited by examiner

*Primary Examiner* — Daniel Wu
*Assistant Examiner* — Mark Rushing

(57) ABSTRACT

The present invention relates to a method for constructing location management system using RFID series. In particular, the present invention provides RFID series to complete work with a little time and workforce without confusion by concurrently installing a number of RFID tags, even where a number of RFID tags are required in order to constitute an RFID system, and a method for constructing a system to effectively manage the location of an objective space using RFID series, wherein additional drawings (or computerized drawings) for an objective space are nor required even where RFID tags are attached over a considerably wide space, but rather drawings for location management system of an objective space can be produce by attaching RFID tags.

4 Claims, 3 Drawing Sheets

[Figure 1]
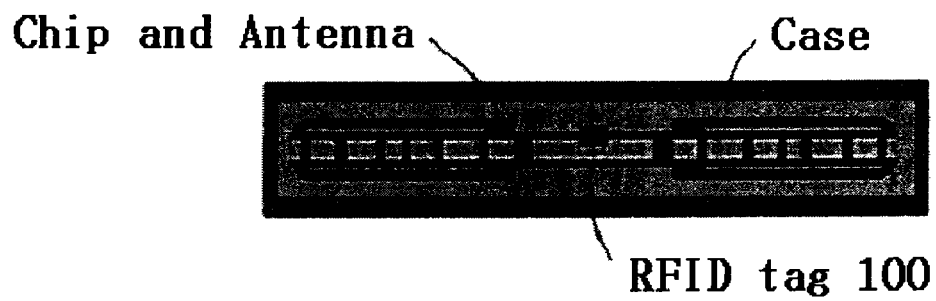
[Figure 2]
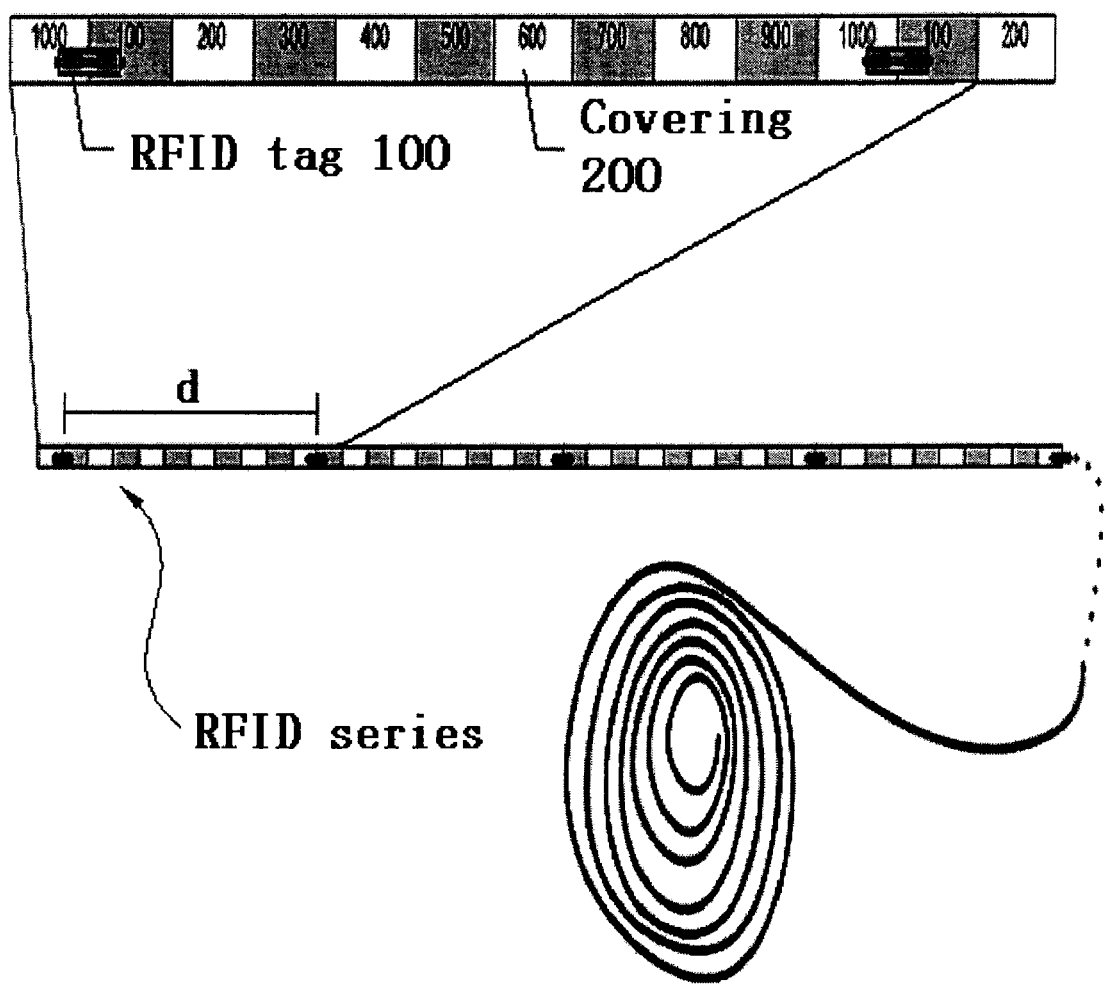

[Figure 3]
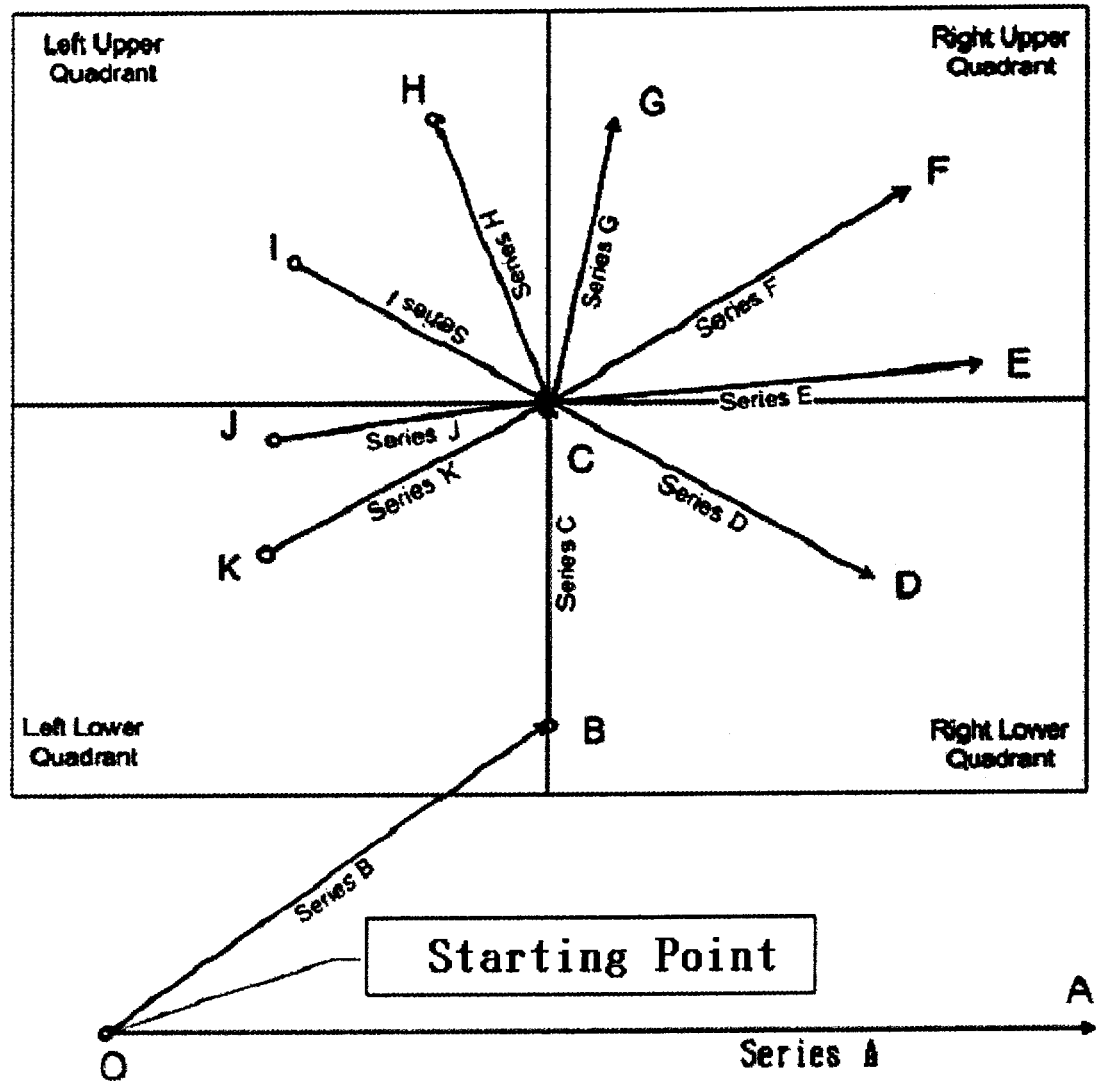

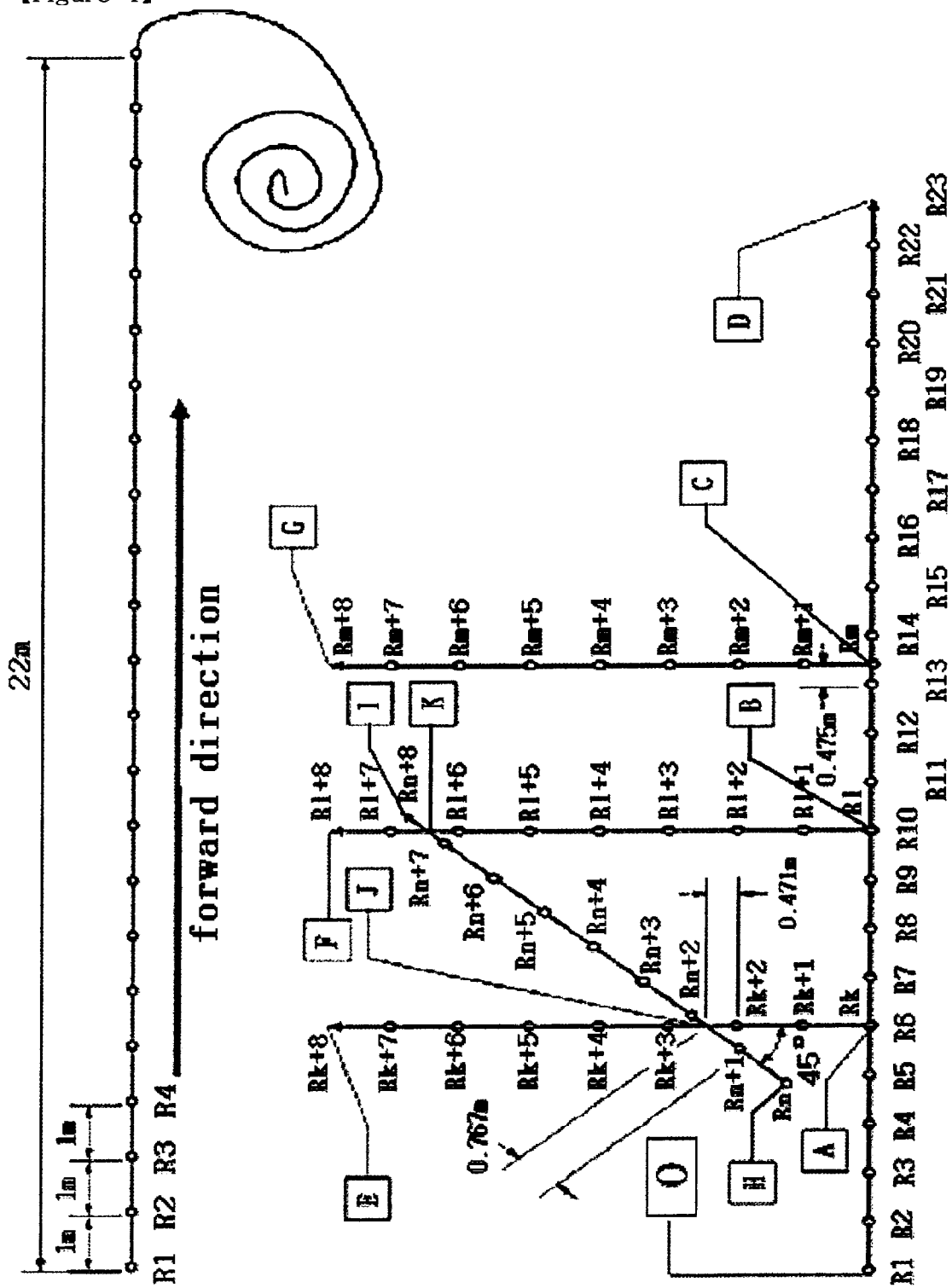
[Figure 4]

METHOD FOR CONSTRUCTING LOCATION MANAGEMENT SYSTEM USING RFID SERIES

TECHNICAL FIELD

The present invention relates to a method for constructing a location management system using RFID series, and belongs to the field of a radio communication using RFID.

BACKGROUND ART

An Radio Frequency IDentification (hereafter, referred to as "RFID") system is a kind of a radio communication system which consists of RFID, an antenna, a reader and a writer, wherein the RFID is moved by attaching to an article and moves, and performs a radio communication with an antenna fixed on the ground or a building. The reader controls communication between an antenna and RFID or performs a protocol exchange between an upper-level device, such as a computer, and RFID. Recently, there are many readers with a built-in antenna.

RFID is one of the constituents of an RFID system. The RFID is required to satisfy the following three conditions concurrently: (i) the size should be convenient for carrying; (ii) information should be stored in an electronic circuit; and (iii) the communication should be made by non-contact communication. Accordingly, although a floppy disc, a magnetic card, a contact IC card, etc. are convenient to store data and to be carried, they are not included in RFID. Although RFID broadly covers a non-contact IC card (RF card), it generally refers to an RF tag.

RFID is used to identify an article, to which an RFID tag is attached, and information on the article. In other words, when and where a product exists, required information can be taken out and new information can be wrote down, if necessary. When using RFID, we can save time spending in inquiring an information center of required information and receiving the response. Further, this RFID system has advantages, such as an easy distributed process of information and simplification of information system.

In particular, an automatic identification means used in an automatic processing line should resist harsh environments, such as vibration and impact, water and oil, high temperature and dust, etc., under which RFID is suitable. Additionally, RFID is more suitable for the cases where batch production is made on one production line, and a frequent exchange of information on a target object is required. Although RFID was used as a substitution for a bar code at a relatively early logistics stage, such as a production process or a logistics center, it tends to be gradually extended to a final distribution stage, such a distribution stage.

The RFID tag refers to RFID attachable to an article, and is valuable in the field of an FA (Factory Automation). An RFID tag largely consists of a chip and an antenna, and has a completed shape through an encapsulation process to protect the RFID tag. The RFID tag has various shapes, such as a credit card, a stick, a coin, a label, etc., depending on an encapsulation method so that a user can select a shape suitable for his/her purpose. The RFID tag is independently separated and manufactured in the shape of piece. Hereinafter, an RFID tag previously manufactured in the shape of piece is referred to as an "independent RFID tag."

However, where a plurality of RFID tags are required to form an RFID system (e.g., a location management system), the following problems are found in the previous independent RFID tag.

First, each of independent RFID tags has the same appearance and thus is not distinguishable from one another.

Second, even where RFID tags constituting the RFID system are installed at fixed intervals, they should be individually installed one by one, which is very cumbersome.

Third, in order to confirm ID of each independent RFID tag in the process of installing independent RFID tags, a user should read the tags one by one. Further, even if ID is wrote down on the surface of each independent RFID tag in or after the process of encapsulation of RFID, it is difficult to keep the order of these tags in the process of installation because these independent RFID tags are separated from one another one by one. Further, once the order has been scattered, management is more difficult.

Fourth, the more the plurality of independent RFID tags to be installed increases, the more seriousness of these problems increases.

Therefore, considerable time and workforce are required in order to install independent RFID tags, and at the same time unnecessary confusion is generated.

DISCLOSURE

Technical Problem

The present invention has been suggested to solve the above-mentioned problems, and provides a RFID series, wherein a number of RFID tags are concurrently installed without the need of installing RFID tags one by one and ID of each RFID tag is automatically computed, and therefore work can be completed with a little time and workforce without confusion even where a number of RFID tags are required in order to constitute an RFID system, and a method for constructing a system to effectively manage the location of an objective space using the RFID series, wherein an additional drawing (or a computerized drawing) for an objective space is not required even where RFID tags are attached over a considerably wide space, but rather a drawing for location management system of an objective space can be produced by attaching RFID tags.

Technical Solution

In order to accomplish the above-mentioned objective, the present invention provides RFID series encapsulated in the shape of string after wrapping a number of RFID tags with a covering, wherein the RFID tags are continuously arranged at regularly spaced intervals (d), characterized by the covering on which a division or a color indicating connection intervals (d) between the RFID tags is coded. Under the conditions that the RFID series must be installed in a straight line, and that the direction of increasing the length indication of the RFID series should be in forward direction, a method for constructing location management system using RFID series comprises: determining a portion requiring installation of RFID tags in an objective space S110; determining the distance between tags and select RFID series to comply with the distance S120; determining a provisional starting point in one corner of the objective space and install the first RFID series on the provisional starting point as a starting point S130; reading and recording ID of an RFID tag corresponding to the starting point of the first RFID series and ID of an RFID tag corresponding to the final point by use of an RFID reader S140; installing the second RFID series while intersecting with the first RFID series S150; reading and recording ID of the nearest RFID tag in reverse direction from the crossing point on any one phase of the crossing two RFID series and the distance from the RFID tag to the crossing point, and measuring and recording the angle between the forward direction of the two RFID series S160; reading and recording ID of a RFID tag corresponding to the starting point of the second RFID series and ID of a RFID tag corresponding to the final point by use of an RFID reader S170; and continuously repeat the steps 150-170 until all of the locations required on the objective space are found.

Advantageous Effects

According to the present invention, a number of RFID tags are concurrently installed, and thus work can be completed with a little time and workforce without confusion even where a number of RFID tags are required in order to constitute an RFID system. Furthermore, even if there are no additional drawings for an objective space, an RFID system can be constructed in the objective space and computerized management drawings for the objective space can automatically be obtained after construction of the RFID system.

DESCRIPTION OF DRAWINGS

FIG. 1 shows RFID tags of RFID series according to one exemplary embodiment of the present invention.

FIG. 2 shows a covering of RFID series and an encapsulated RFID series with a plurality of RFID tags wrapped by the covering.

FIG. 3 shows principal concept for installation of RFID series to achieve the effect of the present invention.

FIG. 4 shows a state of constructing location management system according to the present invention by installing RFID series on an objective space.

BEST MODE

FIG. 1 shows RFID tags of RFID series according to one exemplary embodiment of the present invention.

RFID tags 100 includes a chip and an antenna, which are surrounded by a case to protect them. The constitution of these RFID tags 100 is identical to that of the conventional RFID tags, and thus a detailed description thereof will be omitted. However, the RFID tags 100 according to the present invention should be wrapped by a covering 200, which will below explained, and be encapsulated in the shape of string. Thus, it is desirable that a case be made of an adhesive label, which is attachable to the covering 200.

FIG. 2 shows a covering of RFID series and an encapsulated RFID series with a plurality of RFID tags wrapped by a covering.

A covering 200 wraps a plurality of RFID tags 100 and encapsulates them in the shape of string. In other words, the plurality of RFID tags 100 are arranged, and then they are wrapped by a covering 200 at a time to form an RFID tag connecting body, which looks like a long electric wire (hereinafter referred to as "RFID series"). If a case of RFID tags 100 is made of an adhesive label, which can be well attached to a covering 200, a process of encapsulating the plurality of RFID tags 100 will be more easily performed. That is, in this case, RFID series according to the present invention can be manufactured simply by attaching RFID tags 100 to the covering 200 without the need of allowing the covering 200 to wrap the plurality of RFID tags 100. Such covering 200 is made of bendable soft materials and is in the shape of a longitudinally droopy RFID.

The RFID series according to the present invention varies depending on the type of RFID tags 100, which is classified based on the technical difference, such as frequency band, etc., intervals between RFID tags 100, quality of a covering 200, etc.

In the RFID series, it is desirable to continuously arrange RFID tags 100 at fixed intervals. There was a problem of requiring considerable time and workforce in the conventional RFID system because a worker should install each of the independent RFID tags one by one, even in the case where RFID tags constituting the RFID system are installed at fixed intervals. To resolve such problem, installation of only one RFID series in a certain space can exhibit an effect of concurrently installing a plurality of RFID tags 100 at fixed intervals (d), in the case where RFID tags 100 on the RFID series are continuously arranged at fixed intervals (d). As such, the necessity of continuously arranging RFID tags 100 at fixed intervals (d) is not limited only to the above reason, which will be explained in detail below.

The connection intervals (d) between RFID tags 100 on RFID series are not limited to one numerical value. That is, RFID series can be manufactured by varying the connection intervals (d) between RFID tags 100 according to purpose or use, etc. In such a case, one who intends to install an RFID system can selectively purchase and install RFID series having connection intervals (d) between RFID tags 100 corresponding to required RFID installation intervals (d). RFID series wherein the connection intervals (d) between RFID tags 100 are 1000 mm will be explained with reference to FIG. 2.

In this case, it is desirable to code a division or a color indicating connection intervals (d) between the RFID tags 100 on a covering 200 of RFID series according to the present invention. If the division or the color is coded on the surface of the covering 200, a worker can easily recognize the intervals at which RFID tags 100 are arranged in the RFID series intended to be installed by the worker. Thus, RFID series having the connection intervals (d) between various RFID tags 100 can be clearly distinguished from each other. There is no possibility of creating confusion in purchasing or installing RFID series. Further, we can clearly grasp the process of installing RFID series in a certain space or the installation location and quantity of RFID tags 100 after installation. For reference, FIG. 2 shows the state where each of the continuously arranged RFID tags 100 is divided into ten; a color is intersected at the interval of 100 mm; and a division of a 100 mm unit is marked on each tag to show information that the connection interval (d) between RFID tags 100 on the concerned RFID series is 1000 mm.

Further, in the RFID series according to the present invention, it is desirable to continuously arrange RFID tags 100 in the ID order. This is because the conventional RFID series has the following disadvantages: In the process of installing independent RFID tags, each RFID tag should be read one by one by use of an RFID reader in order to confirm ID of each of the independent RFID tags. Even if ID is wrote down on the surface of each of the independent RFID tags in or after the process of encapsulating RFID, it is difficult to keep their order (the order of series plurality of ID of each independent RFID tag) in the process of installation because these independent RFID tags are separated one by one, and it is more difficult to manage these tags after separation. To resolve these problems, following advantages are provided. In the case where RFID tags on the RFID series are continuously arranged in the ID order, once a worker installs one of the RFID series in a certain space, and then reads the head RFID tag 100 ID and the end RFID tag 100 of the installed RFID series, IDs of the RFID tags 100 between the head and the end will be arranged in the ascending order from the head RFID tag 100 ID or in the descending order from the end RFID tag 100 ID. Thus, IDs of all RFID tags 100 can be automatically grasped at a time without confirming ID of each independent RFID tag.

If it is not possible to manufacture RFID series according to the present invention by continuously arranging RFID tags 100 in the ID order, the following method is available.

(1s) RFID series is prepared by arranging RFID tags 100 at random regardless of the ID order.

(2s) Database is prepared by reading and recording IDs of RFID tags 100, which are arranged on the RFID series formed in the process of (1s), in turns (hereinafter referred to as "RFID tag ID arrangement information"). For instance, the RFID tag ID arrangement information may be constituted by the following form. 1: ID253, 2: ID20, 3: ID7, 4: ID154, 5: ID34, 6: ID817, 7: ID6732, 8: ID470, 9: ID78, . . . , .

(3s) A seller of RFID series provides a consumer of RFID series with RFID tag ID arrangement information formed in the process of the above (2s) through various recording media. For instance, a seller of RFID series may be able to provide a consumer with a diskette containing RFID tag ID arrangement information of the concerned RFID series concurrently with selling RFID series. In this case, a consumer of RFID series can easily find out IDs of RFID tags 100 around the RFID tag 100 by monitoring RFID tag ID arrangement information after reading ID of one of several RFID tags 100 connected on the RFID series. Meanwhile, it is desirable to monitor the RFID tag ID arrangement information through the Internet. That is, if a consumer of RFID series enters the website of a seller (or a manufacturer) of RFID series and inputs IDs of the head RFID tag and the end RFID tag of the purchased RFID series, a server of a seller (or a manufacturer) of RFID series may provide a consumer with RFID tag ID arrangement information on RFID tags existing between inputted two RFID tags. The above method may exhibit the same effect as the effect obtained when continuously arranging RFID series in the ID order of RFID tags 100.

In the meantime, it is more desirable to write down ID and the arrangement order of RFID tags 100 on a covering 200. If ID and the arrangement order of RFID tags 100 are wrote down on the surface of a covering 200, efficiency will more increase since a worker can perform installation by promptly recognizing RFID tag 100 information included in RFID series that he is installing.

Such utility of RFID series can be more specifically understood as set forth below.

First, although a process of dividing a space in order to install a plurality of RFID tags in an intended space is required, the dividing process may be omitted because the length is marked and a color is coded on RFID series. That is, once a worker simply determines an interval to install RFID tags, selects and installs RFID series having an interval property (i.e., connection intervals between RFID tags 100) corresponding to the interval, the length indication on RFID series will naturally have a function of dividing a space.

Second, in order to obtain information on the concerned zone by reading RFID tags after attaching RFID tags to each of the divided zones, a process of matching a zone ID and ID of RFID tag installed in the zone in advance is required. In case of using independent RFID tags, a process of matching a zone ID and ID of RFID tag one by one by actually reading IDs of all of the installed RFID tags using an RFID reader after installing RFID tags in each zone was required. This process was essentially required because it is not possible to distinguish general independent RFID tags with the naked eye. In replace of this process, we may consider reading all the RFID tags prior to installation of RFID tags, predetermining zones to which each RFID tag is attached, and writing down with a pen or printing a ID zone on the surface of a RFID tag. However, this work is also very cumbersome and is likely to generate confusion.

When using RFID series, we may omit a process of reading ID by use of an RFID reader because ID of RFID tag 100 on RFID series is already known. Further, we may simply assign ID in order to correspond to RFID tag 100 ID after installing RFID series.

Where a bookshelf phase is divided into zones and RFID tags to indicate each zone are attached to the zones in order to manage the location of a long bookshelf phase in a library, the following steps are required, if independent RFID tags are used:

(1) Determine the length of a zone of a bookshelf phase.

(2) Mark zones on the bookshelf phase by measuring the length determined in above (1) with a ruler and assign ID to each zone (zone ID).

(3) Prepare the same plurality of RFID tags as the plurality of divided zones.

(4) Attach the prepared RFID tags to each zone one by one.

(5) Read IDs of RFID tags attached to each zone by use of an RFID reader and input them in the database.

(6) Confirm ID of zone to which a RFID tag read in above (5) is attached, and match it with RFID tag ID on the database.

(7) Repeat above (5) and (6) until all of the attached RFID tags are read.

The foregoing steps are very cumbersome and are likely to generate confusion when increasing the quantity of RFID tags. In particular, steps (2), (4), (5), and (6) are very labor intensive.

However, the above steps may be easily and effectively performed by use of RFID series according to the present invention. FIG. 4 shows a state where a plurality of RFID tags are installed in an intended space by use of RFID series according to the present invention, which is explained below.

(1a) Determine the length of a zone of a bookshelf phase.

(2a) Select RFID series having the interval property corresponding to the length determined in above (1) and install it on the bookshelf.

(3a) Read and record IDs of RFID tags at the head and the end of RFID series installed in above (2a). In this time, it is not necessary to separately read IDs and the arrangement order of RFID tags between the head RFID tag and the end RFID tag because RFID series provides them as its basic properties at the outset. Further, a zone of the bookshelf phase is automatically marked by the length marking division of RFID series phase. In other words, a process of dividing zones one by one by measuring them as in the prior art is not required (4a) Input ID of RFID tag provided together with RFID series in the database, assign zone ID corresponding to ID of RFID in the zone ID order, and match them.

The above method is more simple and effective than the method of using the conventional independent RFID tags on RFID series because the order of RFID tags of RFID series phase is fixed and the intervals are regular. That is, a process of marking a zone on the bookshelf phase is omitted. Further, it is not necessary to read all of the RFID tags one by one. Finally, a process of matching zone ID with RFID tag ID is simply resolved.

Meanwhile, where RFID tags are attached to the bottom in order to manage a wide space, such as a warehouse, a container yard, etc., (hereinafter referred to as an "objective space"), the following processes are required:

(1c) Computerize a drawing for an objective space.

(2c) Determine portions on the computerized drawing to which RFID tags should be attached and assign ID on each location (hereinafter "location ID").

(3c) Find the place corresponding to the location to attach RFID tags determined in the drawing of above (2c), in the objective space, and attach RFID tags on the location.

(4c) Match RFID tag ID with location ID on the drawing.

(5c) Mark the location of RFID tags on the computerized drawing.

(6c) Repeat above processes (3c)-(5c) until all of the RFID tags are installed in the objective space.

However, the following problems are found in substantively applying the above-mentioned method:

First, a drawing for an objective space is necessarily required.

Second, it is required to computerize a drawing.

Third, a survey is required to find the location to attach RFID tags determined in the drawing in an objective space.

Fourth, where an objective space to attach RFID tags is wide, it is likely to cause confusion.

Further, considerable time and workforce are required in obtaining a drawing of an objective space, computerizing it and making a survey to find the location to attach RFID tags determined in the drawing in an objective space. Of course, such burden will be multiplied if the work is conducted over a considerably wide space. Accordingly, if there is a way to produce a drawing regarding location management system of an objective space by attaching RFID tags without requiring an additional drawing (or computerized drawing) of an objective space, even where RFID tags are attached over a considerably wide space, considerable time and cost saving effects will be generated.

Accordingly, the present invention provides a method of inducing an unconventional effect as mentioned above by installing RFID tags using RFID series. The method of using RFID series in the present invention, however, is based on the following premises.

First, RFID series should necessarily be installed in a straight line. If there is a portion requiring a curved line, the curved line should be converted into a straight line adjacent to the curved line and then installed.

Second, the direction of increasing the length indication of REFID series phase should be in forward direction.

Under the foregoing premises, the present invention provides a method for constructing location management system using RFID series comprises: determining a portion requiring installation of RFID tags in an objective space S110; determining the distance between tags and select RFID series to comply with the distance S120; determining a provisional starting point in one corner of the objective space and install the first RFID series on the provisional starting point as a starting point S130; reading and recording ID of an RFID tag corresponding to the starting point of the first RFID series and ID of an RFID tag corresponding to the final point by use of an RFID reader S140; installing the second RFID series while intersecting with the first RFID series S150; reading and recording ID of the nearest RFID tag in reverse direction from the crossing point on any one phase of the crossing two RFID series and the distance from the RFID tag to the crossing point, and to measure and record the angle between the forward direction of the two RFID series S160; reading and recording ID of a RFID tag corresponding to the starting point of the second RFID series and ID of an RFID tag corresponding to the final point by use of an RFID reader S170; and continuously repeating steps 150-170 until all of the locations required on the objective space are found S180.

At step 110, where a portion requiring installation of RFID tags in an objective space is determined, a drawing of an objective space will be helpful in making a plan. However, such a drawing is not essential in the present invention.

At step 130 or step 150, where RFID series is installed in an objective space, the RFID series should always be installed in a straight line as provided above as the premises. Further, if RFID series is far away towards the right direction from the starting point, it should be installed in forward direction. In reference of FIG. 3, the principle of installing RFID series can be explained as follows:

A corner in a space (objective space) to install RFID series is determined as a starting point, "0" and RFID series is installed. As compared with the starting point, Point A is in the right direction, and thus the forward direction in RFID series A is from 0 to A. As compared with the starting point, Point B is in the right upper direction, and thus the forward direction in RFID series B is from 0 to B. As compared with Point B, Point C is in the upper direction, and thus the forward direction in RFID series is from B to C. As compared with Point C, Point D is in the right direction, and thus the forward direction in RFID series D is from C to D. As compared with Point C, Points E, F, and G are also in the right upper direction, and thus the forward directions in RFID series E, F, and G are from C to E, from C to F, and from C to G, respectively. However, as compared with Point C, Points H, I, J, and K are in the left direction, and thus the reverse directions in RFID series H, I, J, and K are from C to H, from C to I, from C to J, and from C to K, respectively.

Meanwhile, where a corner in an objective space is defined as a provisional starting point at step 130, and the first RFID series is installed from the provisional starting point as a starting point, it is advisable to define a left lower corner in an objective space as such a provisional starting point for convenience of installation of RFID series. In this case, all RFID series may be simply installed only in forward direction based on the starting point, and thus troublesomeness, such as intentionally distinguishing the direction of RFID, may disappear, as shown in FIG. 4.

At step 180, a starting point, a final point, and a crossing point of RFID series are defined as coordinates having seven variables, respectively (hereinafter, "location coordinates"), and a required optional location of an objective space phase can be inferred and found from the interrelation of the location coordinates.

Such location coordinates are in the form of a combination of seven variables (a1, a2, a3, b1, b2, b3, c1), wherein a1 is a variable showing ID of the nearest RFID tag in reverse direction from the crossing point on any one phase of the crossing two RFID series;

a2 is a variable showing whether an RFID tag indicated by a1 is a starting point or a final point of RFID series phase, or any other point, and showing that an RFID tag indicated by a1 is a point other than a starting point or a final point of RFID series phase in which the RFID tag is included, if a2 is "0";

a3 is a variable indicating the distance from an RFID tag indicated by a1 from the crossing point by millimeter;

b1 is a variable playing the same role as a1, and showing ID of the nearest RFID tag in reverse direction from the crossing point on the other one phase of the crossing two RFID series;

b2 is a variable play the same role as a2, and showing whether an RFID tag indicated by b1 is a starting point or a final point of RFID series phase or any other point, and showing if an RFID tag indicated by b1 is a starting point or a final point of RFID series in which the RFID tag is included, if b2 is "0," and an RFID tag indicated by b1 is a point other than a starting point or a final point of the RFID series phase in which the RFID tag is included, if b2 is "1";

b3 is a variable playing the same role as a3, and showing the distance from an RFID tag indicated by b1 to a crossing point by millimeter;

c1 is a variable showing an crossing angle between the two RFID series.

Upon analyzing information on a starting point, a final point, a crossing point, and a crossing angle of RFID series collected at step 180, a rough drawing of an objective space and the location to be managed are displayed in computation by computer. Of course, the drawing is not an architecture drawing. But, it is sufficient for the purpose of location management. If necessary, elements considered necessary for location management, such as a door, a window, a pillar, etc., may be added to the drawing through a supplementary work.

In reference of FIG. 4, a process of step 180 will be explained in more detail below. Meanwhile, an interval property of RFID series installed in FIG. 4 is defined as 1 meter. For convenience in explanation, each RFID tag is defined to have the following serial numbers: R1, R2, R3, . . . , Rn, . . .

First, an indication method of FIG. 4 is explained. Each arrow indicates RFID series, a round end at the head of each arrow indicates a starting point, and a sharp end at the end of each arrow indicates a final point. A heading direction of the arrow is the forward direction of each RFID series. Each of starting points, final points, and crossing points are indicated location coordinates by a combination of seven variables as mentioned above.

Points A to K and O, as designated in FIG. 4, are indicated by the above location coordinates as follows: Point O (R1, 0, 0, nul, nul, nul, nul), Point A (R6, 1, 0, Rk, 0, 0, 90), Point B (R10, 1, 0, R1, 0, 0, 90), Point C (R13, 1, 475, Rm, 0, 0, 90), Point D (R23, 0, 0, nul, nul, nul, nul), Point E (Rk+8, 0, 0, nul, nul, nul, nul), Point F (R1+8, 0, 0, nul, nul, nul, nul), Point G (Rm+8, 0, 0, nul, nul, nul, nul), Point H (Rn, 0, 0, nul, nul, nul, nul), Point I (Rn+8, 0, 0, nul, nul, nul, nul), Point J (Rn+1, 1, 767, Rk+2, 1, 471, 45). Point K does not need to be separately measured because a geometric calculation thereof can be inferred from the foregoing measurement. A process of inferring Point K will be explained in detail below.

The following interpretation from aforementioned location coordinates is possible:

First, the following RFID tags constitute the end points of each RFID series (a starting point or a final point): R1, Rk, R1, Rm, R23, Rk+8, R1+8, Rm+8, Rn, Rn+8.

Second, information on the above end points shows that the following RFID series are in presence: RFID series (R1, R23), RFID series (Rk, Rk+8), RFID series (R1, R1+8), RFID series (Rm, Rm+8), RFID series (Rn, Rn+8), wherein RFID series (R, R23) indicates RFID series consisting of R1, R2, R3, . . . , R21, R22, R23. Since ID and the arrangement order of RFID tags are already known as a basic property of RFID series, the number of RFID tags existing between R1 and R23 and the arrangement type thereof can be obtained from only R1 and R23. That is, as an example of the case where RFID tags on RFID series (R1, R23) phase are continuously arranged in the ID order, if ID of "R1," which is the head RFID tag of RFID series (R1, R23), is "ID12," ID of "R23," which is the end RFID tag, will be "ID34." Finally, we can understand that IDs of RFID tags constituting RFID series (R1, R23) will be "ID12, ID13, . . . , ID22, ID23" in the ascending order. As an example of the case where RFID tags of RFID series (R1, R23) phase are arranged at random regardless of the ID order, if ID of "R1," which is the head RFID tag of RFID series (R1, R23), is "ID12"; ID of "R23," which is the end RFID tag, is "ID78"; and ID arrangement information of RFID tags of the concerned RFID series (R1, R23) is " . . . , 3: ID7, 4: ID154, 5: ID12, 6: ID817, 7: ID6732, . . . , 25: ID470, 26: ID78, 27: ID1124, 28: ID480, 29: ID69, . . . ," we can see that IDs of RFID tags constituting RFID series (R1, R23) will be "ID12, ID817, ID6732, . . . , ID470, ID78, ID1124," respectively. Meanwhile, we can easily understand that the length of RFID series (R1, R23) will be 22 meter from the interval property of RFID series. Of course, the same principle will be applied to other RFID series.

Third, the following RFID tags are not the end points: R6, R10, R13, Rn+1, Rk+2.

Fourth, the above middle points form crossing points as follows:

RFID series (R1, R23) including R6 meets with RFID series (Rk, Rk+8) at 90° to form crossing point A, on which R6 and Rk exist. The distance from 0 to A is 5 meter. And, we can understand that RFID series (Rk, Rk+8) should proceed at 90° in the forward direction from RFID series (R1, R23) on the crossing point.

RFID series (R1, R23) including R10 crosses with RFID series (R1, R1+8) at R10 phase, which is B being 9 meter from 0. RFID series (R1, R1+8) proceeds at 90° in the forward direction from B.

RFID series (R1, R23) including R13 crosses with RFID series (Rm, Rm+8) at 90° at the point being 475 mm from R13 in the forward direction of RFID series (R1, R23). A point of RFID series (Rm, Rm+8) phase forming a crossing point is Rm.

RFID series (Rn, Rn+8) including Rn+1 and RFID series (Rk, Rk+8) including Rk+2 cross at 45° at the crossing points, the point being 767 mm from Rn+1 in the forward direction of RFID series (Rn, Rn+8) phase and the point being 471 mm from Rk+2 in the forward direction of RFID series (Rk, Rk+8) phase.

Fifth, we can understand that if each RFID series is arranged based on the foregoing information, RFID series (Rn, Rn+8) and RFID series (R1, R1+8) will cross. Information on crossing point K between two RFID series can be obtained by the following geometric calculation:

(i) The distance from R6 to R10 is 4 meter.

(ii) As a point of RFID series (R1, R1+8) phase, a point being as many as the distance between Rk and J from R1 (2.471 meter) is defined as J'.

(iii) The distance between J and J' is 4 meter as obtained above in item (i).

(iv) The distance between J' and K is the following: 4 meter*tan (45°=4 meter.

(v) K is 4 meter from J' and 6.471 meter from R1. Accordingly, K is 471 mm from R1+6.

(vi) The distance between J and K is the following: 4 meter/cos (45°=4*1.414=5,656 meter. Accordingly, K is 6.423 meter from Rn+1 (0.767 meter+5.656 meter=6.423 meter) and 423 mm from Rn+7.

(vii) From the foregoing, Point K (Rn+7, 1, 423, R1+6, 1, 471, 45) can be obtained.

As such, if all of the starting points and final points and several crossing points are computerized and recorded, a considerable number of crossing points can be inferred, and a drawing comprising starting points, final points and crossing points can be completed. Accordingly, the present invention enables a worker to construct an RFID system in the concerned objective space without an additional drawing of an objective space. Further, a computerized management drawing of the concerned objective space can be automatically produced after constructing the RFID system.

Meanwhile, this method is applicable to three-dimensional space as well as two-dimensional space. The three-dimensional space is interpreted as a layered two-dimensional plane, i.e., a space formed by accumulating numerous bottom planes as defined above. Accordingly, the location of a point on a space may be indicated by a combination of the vertical location of a plane to which the point belongs and the horizontal location when the plane to which the point belongs overlaps with the bottom plane.

The foregoing embodiments are merely exemplary, and many alternatives, modifications and variations within the scope of the essentials of the present invention will be apparent to a person having ordinary skill in the art to which the present invention pertains. Accordingly, the examples disclosed in the present invention and attached drawings are provided not to limit, but to explain the technical feature of the present invention. The technical feature of the present invention is not limited by these examples and attached drawings. The scope of protection for the present invention should be interpreted based on the claims below and all of the technical features within the equivalent scope should be interpreted to be included in the scope of the present invention.

INDUSTRIAL APPLICABILITY

The present invention is to provide RFID series constituting an RFID system that can complete work with a little time and workforce without confusion, even when a plurality of RFID tags are required, by concurrently installing a plurality of RFID tags without the need of installing RFID tags one by one and simultaneously computing automatically ID of each RFID. Accordingly, if the present invention is introduced into logistics management or warehousing field, its practical and economic value can be sufficiently accomplished.

The invention claimed is:

1. A method for constructing a location management system using an RFID series having the form of string after wrapping a number of RFID tags with a covering, wherein the RFID tags are arranged at regularly spaced intervals, and a division or a color indicating the intervals between the RFID tags is coded on the covering, under the conditions that the RFID series is installed in a straight line, and that a direction of increasing the length indication of the RFID series is a forward direction, the method comprising:
   (a) determining a portion requiring installation of RFID tags in an objective space;
   (b) determining a distance between RFID tags and selecting an RFID series complying with the distance;
   (c) determining a provisional starting point in a corner of the objective space and installing a first RFID series on the provisional starting point as a starting point;
   (d) reading and recording ID of an RFID tag corresponding to the starting point of the first RFID series and ID of an RFID tag corresponding to a final point of the first RFID series by using an RFID reader;
   (e) installing a second RFID series to cross the first RFID series;
   (f) reading and recording ID of the nearest RFID tag in a reverse direction from a crossing point of the first and second RFID series on any one phase of the first and second RFID series and a distance from the nearest RFID tag to the crossing point, and measuring and recording an angle between forward directions of the first and second RFID series;
   (g) reading and recording ID of an RFID tag corresponding to a starting point of the second RFID series and ID of an RFID tag corresponding to a final point of the second RFID series by using the RFID reader; and
   (h) repeating steps (a)-(g) until all of the locations required on the objective space are found.

2. The method of claim 1, wherein, in step (h), a starting point, a final point, and a crossing point of RFID series are defined as location coordinates having a number of variables, respectively, and a required optional location of an objective space phase is inferred and found from the interrelation of the location coordinates.

3. The method of claim 2, wherein the location coordinates are in the form of a combination of seven variables, a1, a2, a3, b1, b2, b3, and c1, and wherein
   a1 is a variable showing ID of the nearest RFID tag in the reverse direction from the crossing point on any one phase of crossing two RFID series;
   a2 is a variable showing whether an RFID tag indicated by a1 is a starting point or a final point of an RFID series phase, or any other point, and showing that the RFID tag indicated by a1 is a point other than the starting point or the final point of the RFID series phase in which the RFID tag is included, if a2 is "0";
   a3 is a variable indicating a distance from the RFID tag indicated by a1 to the crossing point by millimeter;
   b1 is a variable playing the same role as a1, and showing ID of the nearest RFID tag in the reverse direction from the crossing point on another one phase of the crossing two RFID series;
   b2 is a variable playing the same role as a2, and showing whether an RFID tag indicated by b1 is a starting point or a final point of an RFID series phase, or any other point, and showing if the RFID tag indicated by b1 is the starting point or the final point of the RFID series phase in which the RFID tag is included, if b2 is "0", and the RFID tag indicated by b1 is a point other than the starting point or the final point of the RFID series phase in which the RFID tag is included, if b2 is "1";
   b3 is a variable playing the same role as a3, and showing a distance from the RFID tag indicated by b1 to the crossing point by millimeter;
   c1 is a variable showing a crossing angle between the two RFID series.

4. The method of claim 1, wherein, in the case where the corner in the objective space is defined as the provisional starting point, the concerned starting point is defined as a left lower corner.

* * * * *